(12) United States Patent
Wang et al.

(10) Patent No.: US 10,534,482 B2
(45) Date of Patent: Jan. 14, 2020

(54) CONTROL METHOD, APPARATUS AND SYSTEM

(71) Applicant: Beijing Zhigu Rui Tuo Tech Co., Ltd, Beijing (CN)

(72) Inventors: Zhengxiang Wang, Beijing (CN); Lin Du, Beijing (CN)

(73) Assignee: Beijing Zhigu Rui Tuo Tech Co., Ltd, Beijing (CN)

( * ) Notice: Subject to any disclaimer, the term of this patent is extended or adjusted under 35 U.S.C. 154(b) by 0 days.

(21) Appl. No.: 15/517,918

(22) PCT Filed: Jul. 24, 2015

(86) PCT No.: PCT/CN2015/085004
§ 371 (c)(1),
(2) Date: Apr. 7, 2017

(87) PCT Pub. No.: WO2016/054940
PCT Pub. Date: Apr. 14, 2016

(65) Prior Publication Data
US 2017/0308203 A1    Oct. 26, 2017

(30) Foreign Application Priority Data
Oct. 10, 2014   (CN) .......................... 2014 1 0533006

(51) Int. Cl.
*G06F 3/045* (2006.01)
*G06F 3/041* (2006.01)
(Continued)

(52) U.S. Cl.
CPC .............. *G06F 3/044* (2013.01); *B60K 35/00* (2013.01); *G06F 3/0416* (2013.01); *G06F 3/0488* (2013.01)

(58) Field of Classification Search
CPC ..... G06F 3/0488; G06F 3/04883; G06F 3/016
See application file for complete search history.

(56) References Cited

U.S. PATENT DOCUMENTS 8,417,001 B2   4/2013  Niinuma
8,457,692 B2   6/2013  Fyke et al.
(Continued)

FOREIGN PATENT DOCUMENTS

CN   1848058 A    10/2006
CN   102239655 A   11/2011
(Continued)

OTHER PUBLICATIONS

International Search Report for PCT Application No. PCT/CN2015/085004, dated Oct. 28, 2015, 3 pages.

*Primary Examiner* — Nan-Ying Yang
(74) *Attorney, Agent, or Firm* — Amin, Turocy & Watson, LLP

(57) ABSTRACT

The present application provides a control method, apparatus and system. A method comprises: detecting a signal in a circuit; in response to detection of a loopback signal in the circuit, determining that a loop is formed by at least one part of a capacitive touch screen, a device and a user; and in response to formation of the loop, disabling or enabling a function corresponding to the at least one part of the capacitive touch screen. By use of the technical solution provided in the present application, formation of a loop is determined through detection of a loopback signal, thereby determining identity of the user, to disable or enable at least one function. In a scenario like driving, the user's multitasking can be effectively avoided, thereby improving security.

19 Claims, 6 Drawing Sheets

(51) Int. Cl.
*G06F 3/044* (2006.01)
*B60K 35/00* (2006.01)
*G06F 3/0488* (2013.01)

(56) References Cited

U.S. PATENT DOCUMENTS

| | | | |
|---|---|---|---|
| 8,866,760 B2 | 10/2014 | Corroy et al. | |
| 2006/0028453 A1* | 2/2006 | Kawabe | H04N 13/0404 345/173 |
| 2006/0220788 A1 | 10/2006 | Dietz et al. | |
| 2006/0266640 A1* | 11/2006 | Halsey, IV | G06F 3/044 204/192.29 |
| 2007/0063980 A1* | 3/2007 | Eich | G06F 3/0219 345/173 |
| 2009/0273563 A1* | 11/2009 | Pryor | B60K 35/00 345/157 |
| 2010/0214254 A1* | 8/2010 | Tsai | G06F 1/3215 345/174 |
| 2010/0297930 A1 | 11/2010 | Harris | |
| 2012/0218218 A1* | 8/2012 | Kauko | G06F 3/0416 345/174 |
| 2014/0085212 A1* | 3/2014 | Su | G06F 3/0416 345/173 |
| 2014/0340303 A1* | 11/2014 | Grzesiak | G06F 3/0484 345/156 |
| 2014/0365928 A1 | 12/2014 | Boelter et al. | |
| 2016/0070462 A1* | 3/2016 | Baudry | G06F 17/242 715/268 |

FOREIGN PATENT DOCUMENTS

| | | |
|---|---|---|
| CN | 103154862 A | 6/2013 |
| CN | 103207717 A | 7/2013 |
| CN | 104102404 A | 10/2014 |
| CN | 104360809 A | 2/2015 |
| WO | 2014131288 A1 | 9/2014 |

* cited by examiner

CONTROL METHOD, APPARATUS AND SYSTEM

RELATED APPLICATION

The present application is a U.S. National Stage filing under 35 U.S.C. § 371 of international patent cooperation treaty (PCT) application No. PCT/CN2015/085004, filed Jul. 24, 2015, and entitled "CONTROL METHOD, APPARATUS AND SYSTEM", which claims the benefit of priority to Chinese Patent Application No. 201410533006.5, filed on Oct. 10, 2014, which applications are hereby incorporated into the present application by reference herein in their respective entireties.

TECHNICAL FIELD

The present application relates to the field of human-computer interaction technologies, and in particular, to a control method, apparatus and system.

BACKGROUND

A touch screen is an inductive liquid crystal display apparatus that can receive input signals of contacts and the like, and when a graph or button on the screen is touched, a tactile feedback system of the touch screen can drive various apparatuses according to a pre settings. With development of touch screen technologies, more and more devices in life begin to use touch screens, for example, computers, mobile phones and various other electronic devices, automobiles, motorcycles and other vehicles.

Because of advantages of simplicity, convenience and naturalness, the touch screens quickly replace mechanical button panels, and become a human-computer interaction manner with the best user experience at present.

However, use of the touch screens also brings about some inconveniences, if a user of a touch screen, for example, a vehicle driver, controls the touch screen during normal driving, this brings about a safety hazard.

SUMMARY

An example, non-limiting objective of the present application is to provide a control method, apparatus and system.

According to an aspect of at least one example embodiment of the present application, a control method is provided, wherein a device is connected with at least one part of a capacitive touch screen through a circuit; and a user is capable of respectively contacting the device and the capacitive touch screen; the method comprising:

detecting a signal in the circuit;

in response to detection of a loopback signal in the circuit, determining that a loop is formed by at least one part of the capacitive touch screen, the device and the user; and in response to formation of the loop, disabling or enabling a function corresponding to the at least one part of the capacitive touch screen.

According to another aspect of at least one example embodiment of the present application, a control apparatus is provided, comprising: a detection module, configured to detect a signal in a circuit, wherein a device is connected with at least one part of a capacitive touch screen through the circuit; and a user is capable of respectively contacting the device and the capacitive touch screen; a determination module, configured to, in response to detection of a loopback signal in the circuit, determine that a loop is formed by at least one part of the capacitive touch screen, the device and the user; and a control module, configured to, in response to formation of the loop, disable or enable a function corresponding to the at least one part of the capacitive touch screen.

According to another aspect of at least one example embodiment of the present application, a control system is provided, comprising: a device, a capacitive touch screen connected with the device through a circuit and the control apparatus described above.

The control method, apparatus and system of the example embodiments of the present application, by detecting a loopback signal, determine formation of a loop, thereby determining identity of a user, to disable or enable at least one part of functions. In a scenario like driving, the user's multitasking can be effectively avoided, thereby improving security.

DETAILED DESCRIPTION

Example embodiments of the present application are described in detail hereinafter with reference to the accompanying drawings and embodiments. The following embodiments are intended to describe the present application, but not to limit the scope of the present application.

It should be understood by those skilled in the art that, in the embodiments of the present application, the value of the serial number of each following step does not mean an execution sequence, and the execution sequence of each step should be determined according to the function and internal logic thereof, and should not be any limitation to the implementation process of the embodiments of the present application.

In addition, the terms such as "first" and "second" in the present application are merely intended to distinguish different steps, devices or modules, etc., which neither represent any particular technical meaning nor indicate a necessary logical sequence between them.

Figure 1:
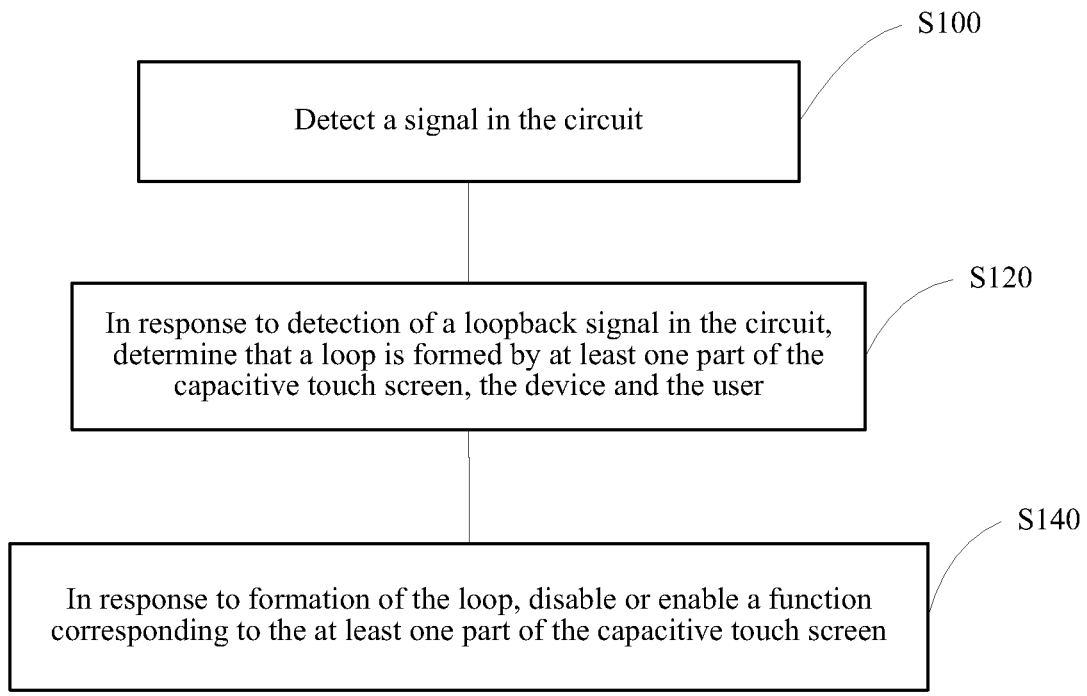
FIG. 1 is a flowchart of the control method according to one example embodiment of the present application.

FIG. 1 is a flowchart of the control method according to one example embodiment of the present application; in the method, a device is connected with at least one part of a capacitive touch screen through a circuit, and a user is capable of respectively contacting the device and the capacitive touch screen. As shown in FIG. 1, the method may comprise:

S100: detecting a signal in the circuit;

S120: in response to detection of a loopback signal in the circuit, determining that a loop is formed by at least one part of the capacitive touch screen, the device and the user; and S140: in response to formation of the loop, disabling or enabling a function corresponding to the at least one part of the capacitive touch screen.

By use of the method in the example embodiment of the present application, formation of a loop is determined through detection of a loopback signal, thereby determining identity of the user, to disable or enable at least one part of functions. In a scenario like driving, the user's multitasking can be effectively avoided, thereby improving security.

Exemplarily, a metal oxide film, for example, an indium tin oxide film, can be sprayed on a glass screen of the capacitive touch screen, and on edges around the touch screen are several electrodes, to enable an alternating current to flow through the whole touch screen in one direction relatively evenly.

In an example embodiment of the present application, when a user contacts the device with one hand and touches a certain position of the capacitive touch screen with the other hand, the alternating current can be conducted to the device through the user's body, and then is conducted back to the capacitive touch screen through the circuit connecting the device and the capacitive touch screen, so as to form loopback of a current signal; in the embodiment of the present application, the current signal looped back is called a loopback signal.

Figure 2:
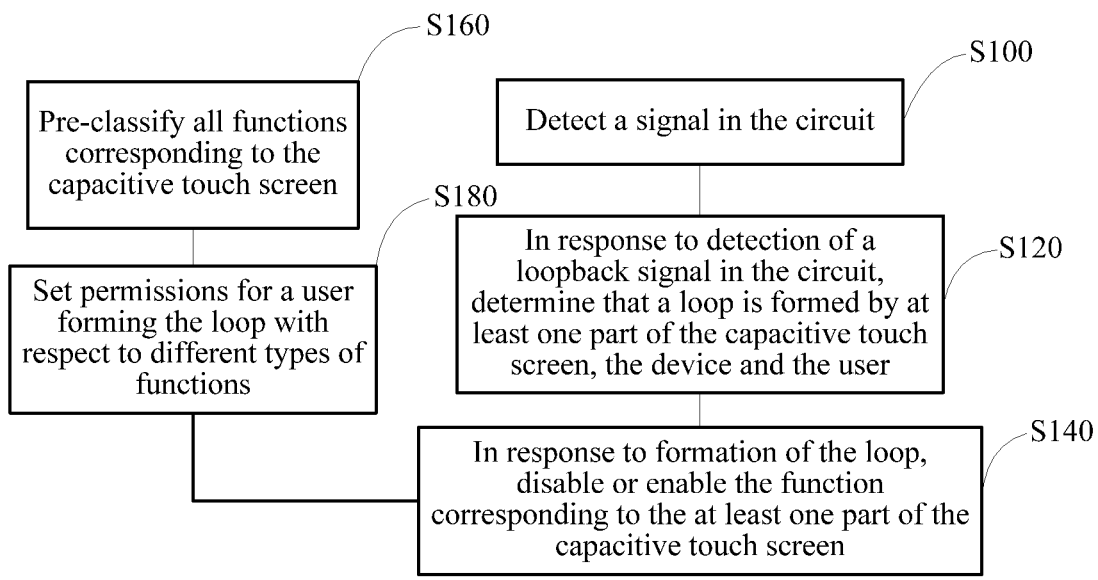
FIG. 2 is a flowchart of the control method according to another example embodiment of the present application.

In an example embodiment, as shown in FIG. 2, the method may further comprise:

S160: pre-classifying all functions corresponding to the capacitive touch screen; and S180: setting permissions for a user forming the loop with respect to different types of functions.

For example, a plurality of graphs or buttons can be displayed on the capacitive touch screen, and each graph or button corresponds to one function. In the embodiment of the present application, these functions can be pre-classified. For the user forming the loop, some types of functions are not suitable for being operated when one hand has contacted the device, and thus the functions can be disabled; while some types of functions can only be operated by the user forming the loop, and thus the functions are only opened for the user forming the loop.

Figure 3:
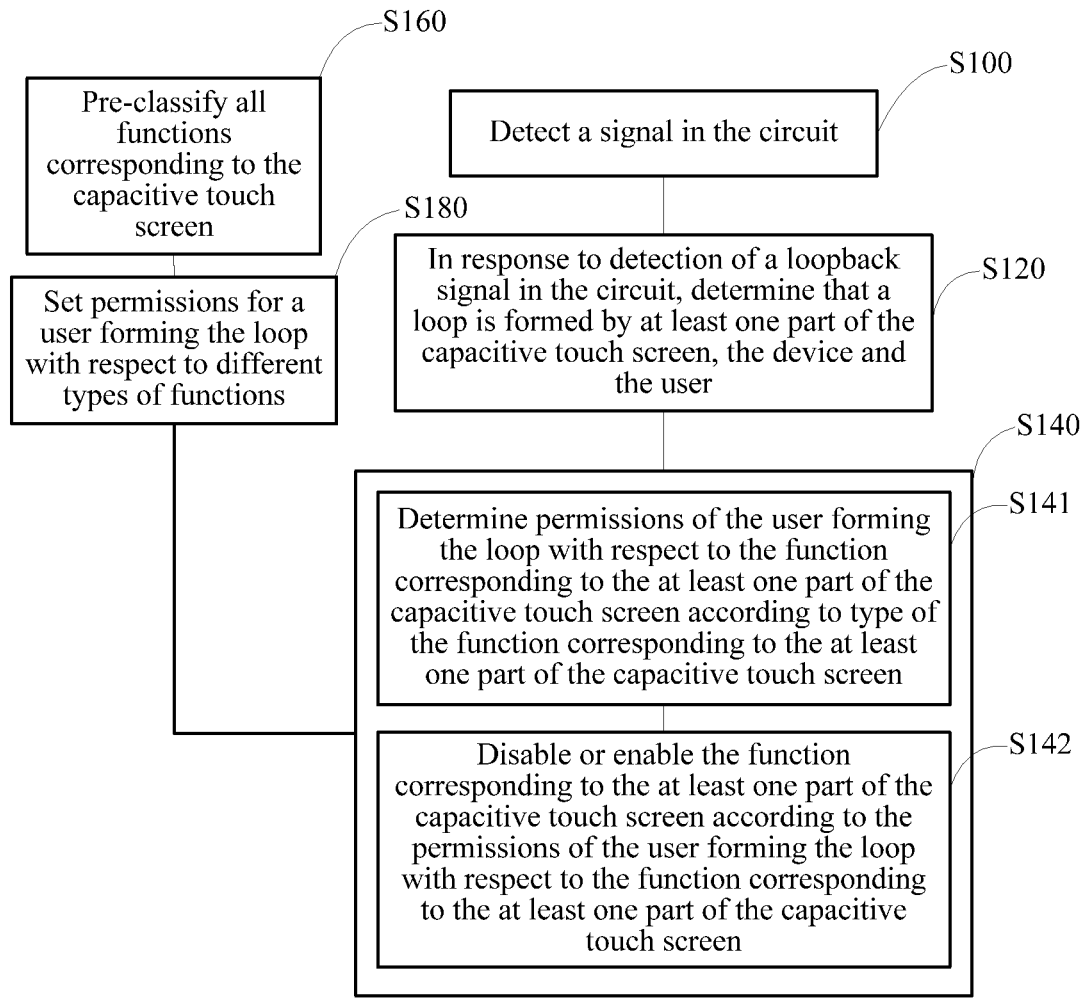
FIG. 3 is a flowchart of the control method according to another example embodiment of the present application.

In another example embodiment, as shown in FIG. 3, the disabling or enabling a function corresponding to the at least one part of the capacitive touch screen comprises in S140 may comprise:

S141: determining permissions of the user forming the loop with respect to the function corresponding to the at least one part of the capacitive touch screen according to type of the function corresponding to the at least one part of the capacitive touch screen; and S142: disabling or enabling the function corresponding to the at least one part of the capacitive touch screen according to the permissions of the user forming the loop with respect to the function corresponding to the at least one part of the capacitive touch screen.

In another example embodiment of the present application, the circuit may comprise a current sensor, which can detect a current signal in the circuit.

To better embody the advantages of the embodiment of the present application, example technical solution(s) provided in the embodiment(s) of the present application are introduced below in more detail in combination with several application scenarios.

Scenario 1

In an example scenario, the device may be at least one part of a steering wheel of a vehicle, the capacitive touch screen is a user interface (UI) of a console of the vehicle, and the steering wheel comprises at least one electrode (not shown).

Figure 4:
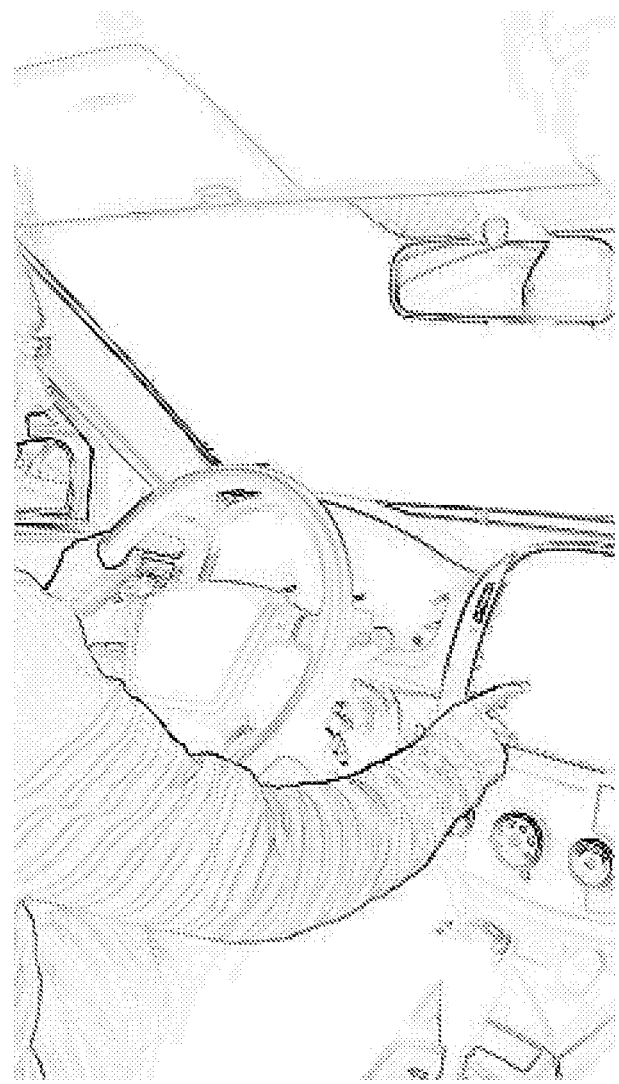
FIG. 4 is a schematic diagram of one specific application scenario according to one example embodiment of the present application.

As shown in FIG. 4, the steering wheel is connected with the console through a circuit, if a user (driver), during driving, grips the steering wheel with one hand and clicks the capacitive touch screen of the console with the other hand, for example, the driver wants to surf the Internet to know about stock market, when the hand of the driver contacts a part of the touch screen, the touch screen, the driver, the steering wheel and the circuit form a loopback circuit, a weak alternating current on the capacitive touch screen enters into the driver's body, is transmitted onto the steering wheel through the electrode on the steering wheel that the other hand of the driver contacts, and is transmitted back to the console through the circuit between the steering wheel and the console.

As is well-known, if the driver diverts his/her attention to doing another thing during driving, potential safety hazard is very large, and traffic accidents easily occur. Therefore, in the scenario, a permission mapping relationship as shown in the following table can be pre-generated:

TABLE 1

| Function Name | Function Type | Permission |
| --- | --- | --- |
| surfing | entertainment | driver disabled |
| playing multimedia | entertainment | driver disabled |
| connecting Bluetooth device | entertainment | driver disabled |
| inputting information | communication | driver disabled |
| calling/answering the phone | communication | driver disabled |
| opening/closing sunroof | vehicle control | only available for the driver |
| opening/closing window | vehicle control | only available for the driver |
| adjusting the height of the chassis | vehicle control | only available for the driver |
| adjusting the lighting angle | vehicle control | only available for the driver |
| automatic parking | vehicle control | only available for the driver |
| satellite navigation | auxiliary driving | available for the driver |

As shown in the table, the permission corresponding to the function "surfing" is "driver disabled", and thus, in the scenario, the driver is forbidden to perform the function. The driver fails to surf the Internet by clicking the touch screen, thereby ensuring driving safety.

Similarly, if the driver clicks the capacitive touch screen and wants to close the sunroof, as shown in the table, the permission corresponding to the function "opening/closing sunroof" is "only available for the driver", and thus the driver succeeds; if another passenger except the driver want to open/close the sunroof, he/she fails, because the permission corresponding to the function is "only available for the driver".

In another example, if the driver clicks the capacitive touch screen and wants to start a GPS navigation, as shown in the table, the permission corresponding to the function "satellite navigation" is "available for the driver", and thus the driver succeeds; if another passenger except the driver want to start the GPS navigation, it is also permissible, because the function does not limited to the driver, and other passengers can also assist the driver to enable the function.

Scenario 2

In another example scenario, the device is at least one part of a seat, the capacitive touch screen is a display of an electronic apparatus, and the seat comprises at least one electrode (not shown).

Figure 5:
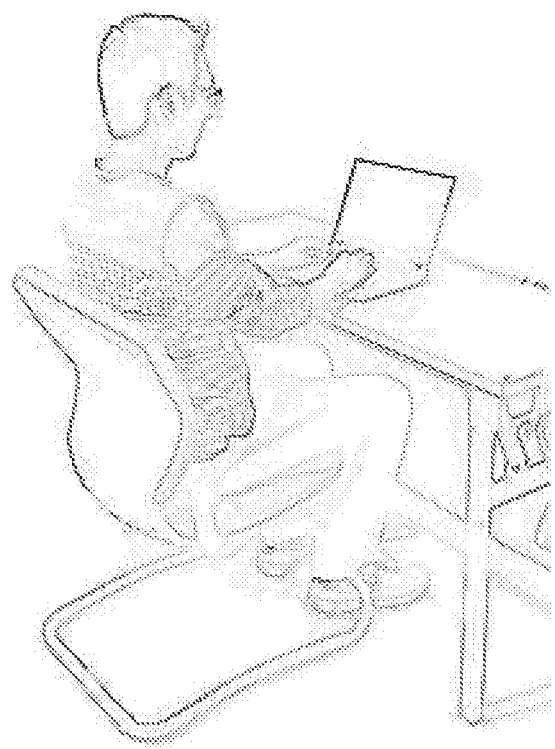
FIG. 5 is a schematic diagram of another specific application scenario according to one example embodiment of the present application.

As shown in FIG. 5, the seat is connected with the electronic apparatus through a circuit, and exemplarily, the electrode can be located on the back or bench of the seat. If a user is in the seat, with his back against the back of the seat, and operates the electronic apparatus by clicking the capacitive touch screen, for example, the user wants to increase brightness of the screen, the touch screen, the user, the seat and the circuit form a loopback circuit, a weak alternating current on the capacitive touch screen enters into the user's body, is transmitted onto the seat through the electrode on the back of the seat that the user's back contacts, and then is transmitted back to the electronic apparatus through the circuit between the seat and the electronic apparatus.

In the example scenario, a permission mapping relationship as shown in the following table can be pre-generated:

TABLE 2

| Function Name | Function Type | Permission |
| --- | --- | --- |
| inputting information | communication | only available for user |
| opening/closing APP | operational control | only available for user |
| adjusting volume | system control | only available for user |
| adjusting brightness | system control | only available for user |
| switching on/off Wifi | system control | only available for user |
| turning up (left)/ turning down (right) | system control | only available for user |

Note: the user in Table 2 refers to the user forming the loop.

As shown in the table, the permission corresponding to the function "adjusting brightness" is "only available for user", and thus, in the scenario, the user succeeds to adjust brightness by clicking the touch screen, while, another user is not allowed to adjust the brightness. This can effectively avoid incorrect operations of other users.

On the other hand, in the scenario, if the user's sitting posture is not correct, for example, lie on his/her stomach, the user, the touch screen and the seat fails to form a loopback circuit, and the user cannot perform operations by clicking the capacitive touch screen. In order to perform operations normally, the user must keep correct posture, so that the back of the user can contact the electrode on the back of the seat, which can correct the user's sitting posture to some extent and is helpful to health of the user's spine, shoulder and neck.

Scenario 3

In the example scenario, the capacitive touch screen is a display of an electronic apparatus, and the device is at least one part of a housing of the electronic apparatus, for example, a rear cover or the housing.

Figure 6:
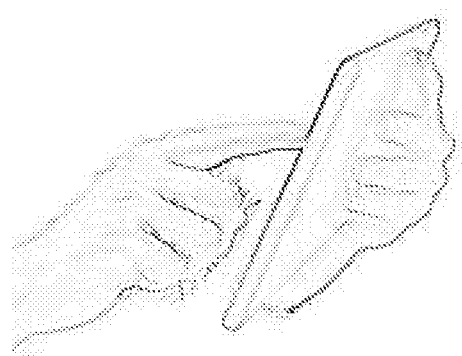
FIG. 6 is a schematic diagram of a further specific application scenario according to one example embodiment of the present application.

As shown in FIG. 6, the capacitive touch screen and the rear cover are connected through a circuit, and if a user grips the housing of the electronic apparatus with one hand and clicks the capacitive touch screen with the other hand, the touch screen, the user, the housing and the circuit form a loopback circuit.

In the example scenario, similarly, the permission mapping relationship as shown in Table 2 may also be pre-generated. Only the user holding the electronic apparatus can enable corresponding function, and if another user wants to perform the same operation, it is not allowed. This can effectively avoid incorrect operations of another user.

On the other hand, in the example scenario, detection of the loopback signal can be further configured to authenticate user identity. For example, in existing electronic apparatuses, biometric fingerprint recognition function is widely used, but some people with bad intention may fake a real user through fingerprint sets or other means to unlock the electronic apparatus. If example technical solution(s) provided in the embodiment(s) of the present application are adopted on the basis of fingerprint recognition, such problems can be effectively avoided. As the fingerprint sets are usually made of insulating materials, the touch screen, the user and the housing cannot form a loopback circuit, and people with bad intention cannot unlock the electronic apparatus, thereby enhancing security of the electronic apparatus.

Figure 7:
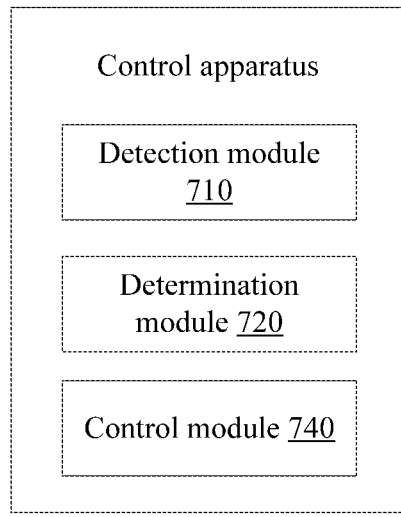
FIG. 7 is a schematic structural diagram of the control apparatus according to one example embodiment of the present application.

FIG. 7 is a schematic structural diagram of the control apparatus according to one embodiment of the present application. As shown in FIG. 7, the apparatus may comprise:

a detection module 710, configured to detect a signal in a circuit, wherein a device is connected with at least one part of a capacitive touch screen through the circuit; and a user is capable of respectively contacting the device and the capacitive touch screen;

a determination module 720, configured to, in response to detection of a loopback signal in the circuit, determine that a loop is formed by at least one part of the capacitive touch screen, the device and the user; and a control module 740, configured to, in response to formation of the loop, disable or enable a function corresponding to the at least one part of the capacitive touch screen.

By use of the control apparatus in the embodiment of the present application, formation of a loop is determined through detection of a loopback signal, thereby determining identity of the user, to disable or enable at least one part of functions. In a scenario driving, the user's multitasking can be effectively avoided, thereby improving security.

Figure 8:
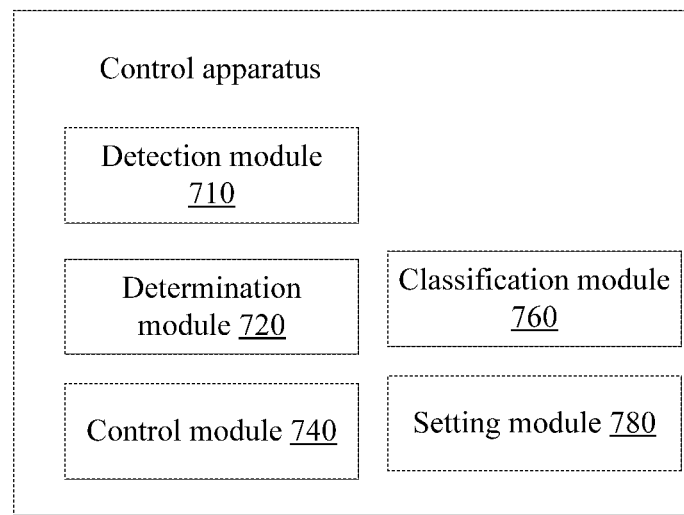
FIG. 8 is a schematic structural diagram of the control apparatus according to another example embodiment of the present application.

Referring to FIG. 8, in one example embodiment, the control apparatus may further comprise:

a classification module 760, configured to pre-classify all functions corresponding to the capacitive touch screen; and a setting module 780, configured to set permissions for a user forming the loop with respect to different types of functions.

Figure 9:
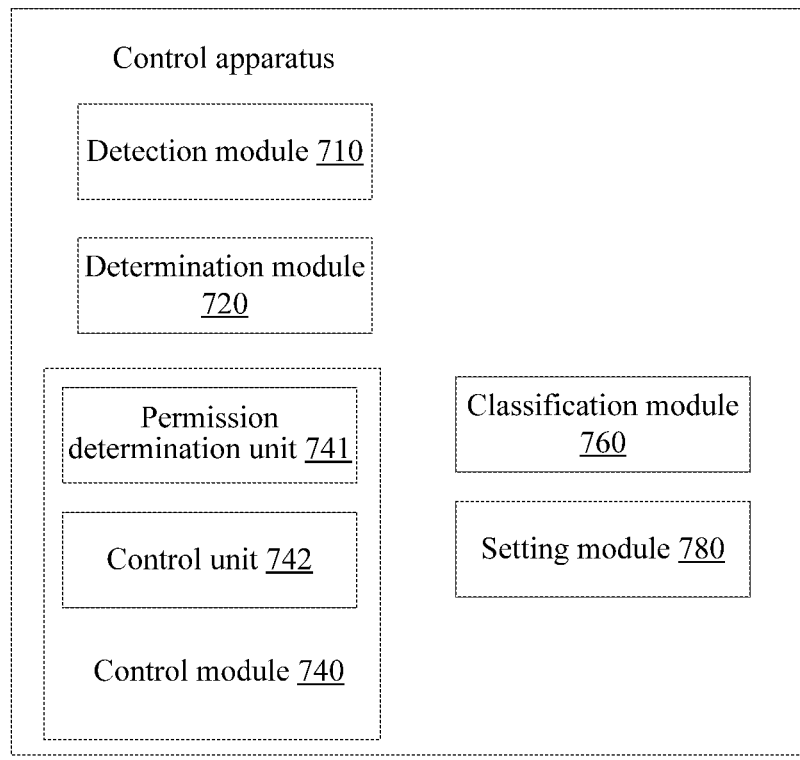
FIG. 9 is a schematic structural diagram of the control apparatus according to another example embodiment of the present application.

Referring to FIG. 9, in one example embodiment, the control module 740 may comprise:

a permission determination unit 741, configured to communicate with the setting module and determine permissions of the user forming the loop with respect to the function corresponding to the at least one part of the capacitive touch screen according to type of the function corresponding to the at least one part of the capacitive touch screen; and a control unit 742, configured to disable or enable the function corresponding to the at least one part of the capacitive touch screen according to the permissions of the user forming the loop with respect to the function corresponding to the at least one part of the capacitive touch screen.

In one example embodiment, the detection module 710 may be a current sensor.

Figure 10:
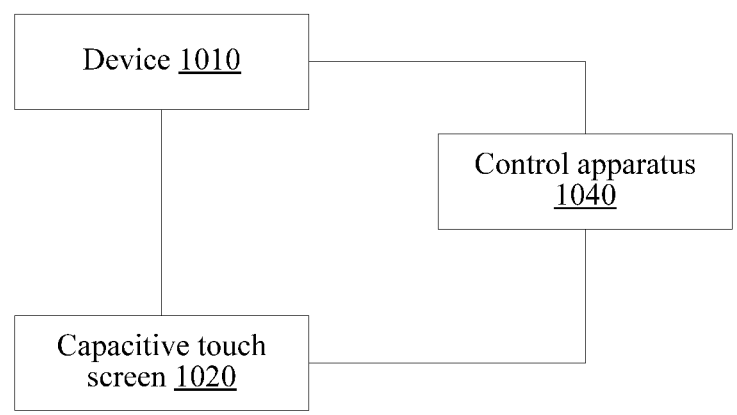
FIG. 10 is a schematic structural diagram of the control system according to one example embodiment of the present application.

One example embodiment of the present application further provides a control system; as shown in FIG. 10, the system may comprise a device 1010, a capacitive touch screen 1020 connected with the device 1010 through a circuit and a control apparatus 1040.

Exemplarily, the control apparatus 1040 may be the control apparatus as shown in FIG. 7 or FIG. 8 or FIG. 9.

Optionally, in one example embodiment, the device may be at least one part of a steering wheel of a vehicle, and the capacitive touch screen may be a UI of a console of the vehicle; wherein the steering wheel comprises at least one electrode.

Optionally, in another example embodiment, the device may be at least one part of a seat, and the capacitive touch screen may be a display of an electronic apparatus; wherein the seat comprises at least one electrode.

Optionally, in another example embodiment, the capacitive touch screen may be a display of an electronic apparatus, and the device may be at least one part of a housing of the electronic apparatus.

Those skilled in the art can clearly understand that, reference can be made to the corresponding process description in the method and/or apparatus embodiments for the specific working procedures of the control system, and will not be repeated herein in order to make the description convenient and concise.

To sum up, by use of the control system in the example embodiments of the present application, formation of a loop is determined through detection of a loopback signal, thereby determining identity of the user, to disable or enable at least one function. In a scenario like driving, the user's multitasking can be effectively avoided, thereby improving security.

It can be appreciated by those of ordinary skill in the art that each exemplary unit and method step described with reference to the embodiments disclosed herein can be implemented by electronic hardware or a combination of computer software and electronic hardware. Whether these functions are executed in a hardware mode or a software mode depends on particular applications and design constraint conditions of the technical solution. The professional technicians can use different methods to implement the functions described with respect to each particular application, but such implementation should not be considered to go beyond the scope of the present application.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer device (which can be a personal computer, a controller, or a network device, and the like) to execute all or some steps of the method described in each embodiment of the present application. The foregoing storage medium comprises, a USB disk, a removable hard disk, a read-only memory (ROM), a random access memory (RAM), a magnetic disk, an optical disk or any other mediums that can be configured to store program codes.

The above example embodiments are only intended to describe the present application rather than to limit the present application; various changes and variations can be made by those of ordinary skill in the art without departing from the spirit and scope of the present application, so all equivalent technical solutions also belong to the category of the present application, and the scope of patent protection of the present application should be defined by the claims.

What is claimed is:

1. A method, comprising:
    detecting a current signal in a circuit;
    in response to detection of a loopback current signal in the circuit, determining that a loop is formed by a device, a user, and at least one part of a capacitive touch screen;
    in response to formation of the loop, disabling or enabling a function corresponding to the at least one part of the capacitive touch screen;
    pre-classifying functions corresponding to the capacitive touch screen; and
    setting permissions of the user forming the loop with respect to different types of the functions based on a user identity associated with the user;
    wherein the device is connected with the at least one part of the capacitive touch screen through the circuit,
    wherein the user is capable of respectively contacting the device and the capacitive touch screen,
    wherein the disabling or the enabling of the function corresponding to the at least one part of the capacitive touch screen comprises:
    determining the permissions of the user forming the loop with respect to the function corresponding to the at least one part of the capacitive touch screen according to a type of the function corresponding to the at least one part of the capacitive touch screen; and
    performing the disabling or the enabling of the function corresponding to the at least one part of the capacitive touch screen according to the permissions of the user forming the loop with respect to the function corresponding to the at least one part of the capacitive touch screen,
    wherein one of at least one graph or at least one button is displayed on the capacitive touch screen, wherein each graph of the at least one graph or each button of the at least one button corresponds to one function, and
    wherein the device is at least one part of a steering wheel of a vehicle, the capacitive touch screen is a user interface of a console of the vehicle, and the steering wheel comprises at least one electrode, or
    wherein the device is at least one part of a seat, the capacitive touch screen is a display of an electronic apparatus, and the seat comprises at least one electrode.

2. The method of claim 1, wherein the circuit comprises a current sensor, and the detecting the current signal in the circuit comprises:
    detecting the current signal in the circuit via the current sensor.

3. An apparatus, comprising:
    a memory that stores executable modules; and
    a processor, coupled to the memory, that executes or facilitates execution of the executable modules, the executable modules comprising:
    a detection module configured to detect a current signal in a circuit, wherein a device is connected with at least one part of a capacitive touch screen via the circuit, and a user is capable of respectively contacting the device and the capacitive touch screen;

a determination module configured to, in response to detection of a loopback current signal in the circuit, determine that a loop is formed by the device, the user, and the at least one part of the capacitive touch screen;

a control module configured to, in response to formation of the loop, disable or enable a function corresponding to the at least one part of the capacitive touch screen;

a classification module configured to pre-classify functions corresponding to the capacitive touch screen; and a setting module configured to set permissions of the user forming the loop with respect to different types of the functions based on an identity of the user, wherein the control module comprises:

a permission determination unit configured to communicate with the setting module and determine the permissions of the user according to a type of the function corresponding to the at least one part of the capacitive touch screen; and a control unit configured to disable or enable the function corresponding to the at least one part of the capacitive touch screen according to the permissions of the user with respect to the function, wherein one of at least one graph or at least one button is displayed on the capacitive touch screen, wherein each graph of the at least one graph or each button of the at least one button corresponds to one function, and wherein the device is at least one part of a steering wheel of a vehicle, the capacitive touch screen is a user interface of a console of the vehicle, and the steering wheel comprises at least one electrode, or wherein the device is at least one part of a seat, the capacitive touch screen is a display of an electronic apparatus, and the seat comprises at least one electrode.

4. The apparatus of claim 3, wherein the detection module comprises a current sensor.

5. A system, comprising:

a device; and a capacitive touch screen connected with the device via a circuit and a control apparatus, the control apparatus comprising:

a detection module configured to detect a current signal in a circuit, wherein a device is connected with at least one part of a capacitive touch screen via the circuit, and a user is capable of respectively contacting the device and the capacitive touch screen, a determination module configured to, in response to detection of a loopback current signal in the circuit, determine that a loop is formed by the device, the user, and the at least one part of the capacitive touch screen;

a control module configured to, in response to formation of the loop, disable or enable a function corresponding to the at least one part of the capacitive touch screen;

a classification module configured to pre-classify functions corresponding to the capacitive touch screen; and a setting module configured to set permissions applicable to the user forming the loop with respect to different types of the functions based on an identity of the user, wherein the control module comprises:

a permission determination unit configured to communicate with the setting module and determine the permissions applicable to the user with respect to the function corresponding to the at least one part of the capacitive touch screen according to a type of the function corresponding to the at least one part of the capacitive touch screen, and a control unit configured to disable or enable the function corresponding to the at least one part of the capacitive touch screen according to the permissions applicable to the user with respect to the function, wherein one of at least one graph or at least one button is displayed on the capacitive touch screen, wherein each graph of the at least one graph or each button of the at least one button corresponds to one function, and wherein the device is at least one part of a steering wheel of a vehicle, the capacitive touch screen is a user interface of a console of the vehicle, and the steering wheel comprises at least one electrode, or wherein the device is at least one part of a seat, the capacitive touch screen is a display of an electronic apparatus, and the seat comprises at least one electrode.

6. A non-transitory computer readable device comprising executable instructions that, in response to execution, cause a system comprising a processor to perform operations, comprising:

detecting a current signal in a circuit;

in response to detection of a loopback current signal in the circuit, determining that a loop is formed by a device, a user, and at least one part of a capacitive touch screen; and in response to formation of the loop, disabling or enabling a function corresponding to the at least one part of the capacitive touch screen;

pre-classifying functions corresponding to the capacitive touch screen; and setting permissions for the user forming the loop with respect to different types of the functions based on an identity of the user, wherein the device is connected with the at least one part of the capacitive touch screen through the circuit, wherein the user is capable of respectively contacting the device and the capacitive touch screen, wherein the disabling or the enabling of the function corresponding to the at least one part of the capacitive touch screen comprises:

determining the permissions of the user with respect to the function corresponding to the at least one part of the capacitive touch screen according to a type of the function corresponding to the at least one part of the capacitive touch screen; and performing the disabling or the enabling of the function corresponding to the at least one part of the capacitive touch screen according to the permissions of the user with respect to the function, wherein one of at least one graph or at least one button is displayed on the capacitive touch screen, wherein each graph of the at least one graph or each button of the at least one button corresponds to one function, and wherein the device is at least one part of a steering wheel or a seat of a vehicle, the capacitive touch screen is a user interface of a console of the vehicle or a display of an electronic apparatus, and the steering wheel or the seat comprises at least one electrode.

7. The non-transitory computer readable storage device of claim 6, wherein the circuit comprises a current sensor, and the detecting the current signal in the circuit comprises:

detecting the current signal in the circuit via the current sensor.

8. The apparatus of claim 4, wherein the current signal in the circuit is detected via the current sensor.

9. The method of claim 1, wherein the capacitive touch screen comprises a metal oxide film.

10. The method of claim 9, wherein the metal oxide film comprises indium tin oxide.

11. The apparatus of claim 3, wherein the capacitive touch screen comprises a metal oxide film.

12. The apparatus of claim 11, wherein the metal oxide film comprises indium tin oxide.

13. The system of claim 5, wherein the capacitive touch screen comprises a metal oxide film.

14. The system of claim 13, wherein the metal oxide film comprises indium tin oxide.

15. The non-transitory computer readable storage device of claim 6, wherein the capacitive touch screen comprises a metal oxide film.

16. The non-transitory computer readable storage device of claim 15, wherein the metal oxide film comprises indium tin oxide.

17. The method of claim 1, wherein each graph of the at least one graph or each button of the at least one button is pre-classified.

18. The apparatus of claim 3, wherein each graph of the at least one graph or each button of the at least one button is pre-classified.

19. The system of claim 5, wherein each graph of the at least one graph or each button of the at least one button is pre-classified.

* * * * *